United States Patent
Hu et al.

(10) Patent No.: US 11,523,468 B2
(45) Date of Patent: Dec. 6, 2022

(54) METHOD FOR OBTAINING CONFIGURATION INFORMATION OF NETWORK DEVICE AND RELATED APPARATUS

(71) Applicant: HUAWEI TECHNOLOGIES CO., LTD., Guangdong (CN)

(72) Inventors: Xingxing Hu, Shanghai (CN); Philippe Reininger, Issy les Moulineaux (FR); Hongzhuo Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 2 days.

(21) Appl. No.: 17/212,892

(22) Filed: Mar. 25, 2021

(65) Prior Publication Data

US 2021/0212169 A1 Jul. 8, 2021

Related U.S. Application Data (63) Continuation of application No. PCT/CN2019/107477, filed on Sep. 24, 2019.

(30) Foreign Application Priority Data

Sep. 28, 2018 (CN) .......................... 201811146851.1

(51) Int. Cl.
*H04W 92/20* (2009.01)
*H04L 41/08* (2022.01)
(Continued)

(52) U.S. Cl.
CPC ......... *H04W 92/20* (2013.01); *H04L 41/0803* (2013.01); *H04W 8/08* (2013.01); *H04W 80/06* (2013.01); *H04W 76/16* (2018.02)

(58) Field of Classification Search
None
See application file for complete search history.

(56) References Cited

U.S. PATENT DOCUMENTS

2012/0294227 A1* 11/2012 Zhang ............... H04W 36/0058
370/315
2016/0105920 A1* 4/2016 Huang .................. H04W 76/12
370/328

FOREIGN PATENT DOCUMENTS

CN 102316604 A 1/2012
CN 102892165 A 1/2013
(Continued)

OTHER PUBLICATIONS

LG Electronics Inc., "TNL Address Discovery for X2 setup Between HeNBs," 3GPP TSG-RAN WG3 Meeting #70, R3-103397, Jacksonville, USA, Nov. 15-19, 2010, 2 pages.

(Continued)

*Primary Examiner* — Yemane Mesfin
*Assistant Examiner* — Jeff Banthrongsack
(74) *Attorney, Agent, or Firm* — Fish & Richardson P.C.

(57) ABSTRACT

Example communications systems, methods and network devices are described. One example method includes sending a first message by a first access network device to a core network device to enable the core network device to send a second message to a second access network device, where the first message includes an identity of the second network device. The first message is used to request for X2 transport network layer (TNL) configuration information of a third network device, and the third network device is a network device that has established an X2 connection to the second network device. The first network device receives the X2 TNL configuration information of the third access network device from the second access network device. Therefore, a network device connected to a control plane of a core (Continued)

network can obtain TNL addresses of more network devices that are not connected to the control plane of the core network.

18 Claims, 5 Drawing Sheets

(51) Int. Cl.
*H04W 8/08* (2009.01)
*H04W 76/16* (2018.01)
*H04L 41/0803* (2022.01)
*H04W 80/06* (2009.01)

(56) References Cited

FOREIGN PATENT DOCUMENTS

| | | |
|---|---|---|
| CN | 103404227 A | 11/2013 |
| CN | 103581875 A | 2/2014 |
| CN | 103582173 A | 2/2014 |
| CN | 104469883 A | 3/2015 |
| CN | 107094309 A | 8/2017 |
| WO | 2014069908 A1 | 5/2014 |
| WO | 2014069954 A1 | 5/2014 |
| WO | 2014117694 A1 | 8/2014 |
| WO | 2014196371 A2 | 12/2014 |
| WO | 2015043292 A1 | 4/2015 |

OTHER PUBLICATIONS

3GPP TS 36.300 V15.2.0 (Jun. 2018), "3rd Generation Partnership Project;Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," Jun. 2018, 357 pages.

New Postcom, "Solutions to TNL address discovery and X2 setup," 3GPP TSG RAN WG3 Meeting #79BIS, R3-130481, Chicago, U.S.A., Apr. 15-19, 2013, 5 pages.

3GPP TS 36.413 V15.3.0 (Sep. 2018), "3rd Generation Partnership Project; Technical Specification Group Radio Access Network; Evolved Universal Terrestrial Radio Access Network (E-UTRAN); S1 Application Protocol (S1AP) (Release 15)," Sep. 2018, 383 pages.

New Postcom, "Solutions to TNL address discovery and X2 setup," 3GPP TSG RAN WG3 Meeting #80, R3-130902, Fukuoka, Japan, May 20-24, 2013, 3 pages.

Office Action in Chinese Application No. 201811146851.1, dated Mar. 3, 2021, 13 pages.

PCT International Search Report and Written Opinion in International Application No. PCT/CN2019/107477, dated Dec. 25, 2019, 16 pages.

Anonymous, "X2 Handover Cases," retrieved from URL <https://wenku.baidu.com/view/7b450f3df01dc281e43af00c.html>, Dec. 10, 2014, 8 pages (partial English translation).

Fujitsu, "TNL address discovery of the neighbouring eNB for Relays," 3GPP TSG-RAN WG3 #70bis, R3-110246, Dublin, Ireland, Jan. 17-21, 2011, 4 pages.

Office Action issued in Chinese Application No. 201811146851.1 dated Nov. 17, 2021, 5 pages.

Extended European Search Report issued in European Application No. 19867323.8 dated Sep. 24, 2021, 9 pages.

Office Action issued in Indian Application No. 202127010096 dated Feb. 4, 2022, 7 pages.

\* cited by examiner

METHOD FOR OBTAINING CONFIGURATION INFORMATION OF NETWORK DEVICE AND RELATED APPARATUS

CROSS-REFERENCE TO RELATED APPLICATIONS

This application is a continuation of International Patent Application No. PCT/CN2019/107477, filed on Sep. 24, 2019, which claims priority to Chinese Patent Application No. 201811146851.1, filed on Sep. 28, 2018. The disclosures of the aforementioned applications are hereby incorporated by reference in their entireties.

TECHNICAL FIELD

This application relates to the field of communications technologies, and in particular, to a method for obtaining configuration information of a network device and a related apparatus.

BACKGROUND

Dual connectivity (DC) is a communications technology used to improve radio resource utilization and reduce a delay on handover in communications systems. In a communications system using a dual connectivity technology, one terminal device may simultaneously communicate with a plurality of network devices, so that a communication service is provided for the terminal device by using resources of the plurality of network devices. Connections between the terminal device and the plurality of network devices form dual connectivity. The plurality of network devices may be network devices using a same standard. For example, the plurality of network devices are all network devices using a 4G standard. Alternatively, the plurality of network devices may be network devices using different standards. For example, a network device using a 4G standard and a network device using a 5G standard exist in the plurality of network devices. In the plurality of network devices, a network device that exchanges control plane signaling with a core network is a primary network device, and a network device that does not exchange control plane signaling with the core network is a secondary network device.

Before the primary network device and the secondary network device provide the communication service for the terminal device in a dual connectivity manner, an X2 connection needs to be established between the primary network device and the secondary network device to transmit a signaling message for resource coordination. To establish the X2 connection, the primary network device and the secondary network device need to determine transport network layer (TNL) addresses of each other. In a non-standalone (NSA) scenario, there are some network devices (referred to as network devices A below) that are not connected to a control plane of a core network. When dual connectivity is established, the network device A may be used as a secondary network device. A TNL address of another network device (referred to as a network device B below) that is connected to the control plane of the core network is preset in the network device A. In some current solutions, after the network device A establishes an X2 connection to the network device B based on the preset TNL address of the network device B, the network device B notifies the core network, namely, a mobility management entity (MME) connected to the network device B, of an association relationship between the network device A and the network device B. When another network device B needs to establish an X2 connection to the network device A, the another network device B sends, to the core network, namely, an MME connected to the another network device B, a request that carries an identity (ID) of the network device A, to request to obtain a TNL address of the network device A. In this manner, only a TNL address of a network device A that is managed by an MME and that is connected to a network device B managed by the same MME can be obtained; a TNL address of a network device A that is managed by an MME and that is connected to a network device B managed by another MME cannot be obtained. Consequently, a scenario in which the TNL address of the network device A can be obtained is limited.

SUMMARY

This application provides a method for obtaining configuration information of a network device and a related device, to resolve a problem that a scenario in which a TNL address of a network device that is not connected to the control plane of a core network is obtained is limited.

According to a first aspect, a method for obtaining configuration information of a network device is provided. The method includes:

sending, by a first network device, a first message to a second network device, where the first message includes an ID of the second network device, the first message is used to obtain X2 TNL configuration information of a third network device, and the third network device is a network device that has established an X2 connection to the second network device; and receiving, by the first network device, a second message sent by the second network device, where the second message includes the X2 TNL configuration information of the third network device.

Each of the first network device and the second network device may be a network device that is connected to a control plane of a core network, and the third network device may be a network device that is not connected to the control plane of the core network. The first network device and the second network device may be network devices using a same standard. For example, both the first network device and the second network device are base stations using a 4G standard, namely, evolved NodeB (eNB or eNodeB). The second network device and the third network device may be network devices of different standards. For example, the third network device is a base station using a 5G standard, namely, a gNB.

In this technical solution, regardless of whether the first network device and the second network device belong to a same MME or different MMEs, both the first network device and the second network device may receive a message sent by each other. Therefore, the first message sent by the first network device to the second network device may be received by the second network device, and the first network device may also receive the second message sent by the second network device. Therefore, regardless of whether the first network device and the second network device belong to a same MME or different MMEs, the first network device may obtain the X2 TNL configuration information of the third network device connected to the second network device, that is, obtain a TNL address of the third network device. According to this technical solution, more TNL addresses can be obtained.

The first network device and the second network device may exchange messages in the following several manners:

1. The first network device and the second network device may directly exchange messages. Specifically, the first network device may send the first message to the second network device based on an X2 connection to the second network device. The first network device may receive, based on the X2 connection to the second network device, the second message sent by the second network device. Optionally, if the first network device and the second network device directly exchange the messages, the first message may not carry the ID of the second network device.

2. The first network device and the second network device may alternatively indirectly exchange messages. The first network device may send a third message to a core network device, where the third message includes the identity of the second network device, and the third message is used to obtain the X2 TNL configuration information of the third network device. Then, the first network device receives the second message sent by the core network device. There may be the following two cases in which the first network device sends the third message to the core network device and receives the second message sent by the core network device.

(1) Both the first network device and the second network device are connected to a first core network device. In this case, the first network device sends the third message to the first core network device, and then the first network device receives the second message sent by the first core network device. Optionally, the third message may include a tracking area ID (TAI) corresponding to the second network device.

(2) The first network device is connected to a first core network device, the second network device is connected to a second core network device, and the first core network device and the second core network device are not a same core network device. In this case, the first network device sends the third message to the first core network device, where the third message includes the ID of the second network device and a TAI corresponding to the second network device, the third message is used to indicate the first core network device to send, when determining, based on the TAI corresponding to the second network device, that the second network device is connected to the second core network device, the first message to the second network device through the second core network device, that is, send the first message to the second core network device. Then, the first network device receives the second message sent by the first core network device.

In the foregoing several manners, the messages can be exchanged between the first network device and the second network device, so that the first network device can obtain the X2 TNL configuration information of the third network device connected to the second network device.

With reference to the first aspect, in a possible implementation, the first message may further include an ID of the third network device. Herein, the ID of the third network device may be an ID of a network device to which the first network device needs to establish an X2 connection. The ID of the third network device is carried in the first message, so that the second network device returns the X2 TNL configuration information of the third network device corresponding to the ID to the first network device only when the X2 connection has been established between the second network device and the third network device corresponding to the ID. In this way, the X2 TNL configuration information that is of the network device and that is expected to be obtained is accurately obtained.

With reference to the first aspect, in a possible implementation, the first message may further include a first indication, and the first indication is used to indicate to obtain the X2 TNL configuration information of the third network device. The first message carries an explicit indication for obtaining the X2 TNL configuration information of the third network device, so that the second network device may determine, based on the first indication, that the first message is a message for requesting to obtain the X2 TNL configuration information of the third network device.

With reference to the first aspect, in a possible implementation, after the receiving, by the first network device, a second message sent by the second network device, the first network device may further establish the X2 connection to the third network device. After establishing the X2 connection to the third network device, the first network device and the third network device may respectively serve as a primary network device and a secondary network device, to form dual connectivity, so as to jointly provide a communication service for a terminal device.

With reference to the first aspect, in a possible implementation, before the sending, by a first network device, a first message to a second network device, the first network device may further determine the second network device and the ID of the second network device based on a fourth message reported by the terminal device or information that is about the second network device and that is locally preset in the first network device, and the fourth message may include at least one type of information of signal strength that is of a network device and that is detected by the terminal device, location information of the terminal device, a neighboring cell ID, or the ID of the second network device.

According to a second aspect, another method for obtaining configuration information of a network device is provided. The method includes:

receiving, by a core network device, a third message sent by a first network device, where the core network device is connected to the first network device, the third message includes an ID of a second network device, the third message is used to obtain X2 TNL configuration information of a third network device, and the third network device is a network device that has established an X2 connection to the second network device; sending, by the core network device, a first message to the second network device, where the first message includes the ID of the second network device, and the first message is used to obtain the X2 TNL configuration information of the third network device; receiving, by the core network device, a second message sent by the second network device, where the second message includes the X2 TNL configuration information of the third network device; and sending, by the core network device, the second message to the first network device.

Each of the first network device and the second network device may be a network device that is connected to a control plane of a core network, and the third network device may be a network device that is not connected to the control plane of the core network. The first network device and the second network device may be network devices using a same standard. For example, both the first network device and the second network device are base stations using a 4G standard, namely, eNBs or eNodeBs. The second network device and the third network device may be network devices using different standards. For example, the third network device is a base station using a 5G standard, namely, a gNB.

In this technical solution, after receiving the third message sent by the first network device, the core network device sends, to the second network device, the first message for obtaining the X2 TNL configuration information of the third network device, and then forwards, to the first network device, the second message sent by the second network device. In this solution, the first network device can obtain the X2 TNL configuration information of the third network device connected to all second network devices managed by the core network device.

With reference to the second aspect, in a possible implementation, the third message further includes a TAI corresponding to the second network device.

According to a third aspect, still another method for obtaining configuration information of a network device is provided. The method includes:

receiving, by a second network device, a first message sent by a first network device, where the first message is used to obtain X2 TNL configuration information of a third network device, the third network device is a network device that has established an X2 connection to the second network device, and the first message includes an ID of the second network device; obtaining, by the second network device, the X2 TNL configuration information of the third network device; and sending, by the second network device, a second message to the first network device, where the second message includes the X2 TNL configuration information of the third network device.

Each of the first network device and the second network device may be a network device that is connected to a control plane of a core network, and the third network device may be a network device that is not connected to the control plane of the core network. The first network device and the second network device may be network devices using a same standard. For example, both the first network device and the second network device are base stations using a 4G standard, namely, eNBs or eNodeBs. The second network device and the third network device may be network devices of different standards. For example, the third network device is a base station using a 5G standard, namely, a gNB.

In this technical solution, regardless of whether the first network device and the second network device belong to a same MME or different MMEs, both the first network device and the second network device may receive a message sent by each other. Therefore, the first message sent by the first network device to the second network device may be received by the second network device, and the first network device may also receive the second message sent by the second network device. Therefore, regardless of whether the first network device and the second network device belong to a same MME or different MMEs, the first network device may obtain the X2 TNL configuration information of the third network device connected to the second network device, that is, obtain a TNL address of the third network device. According to this technical solution, more TNL addresses can be obtained.

The second network device and the first network device may exchange messages in the following several manners:

1. The second network device and the first network device may directly exchange messages. Specifically, the second network device may receive, based on an X2 connection to the first network device, the first message sent by the first network device. The second network device may send the second message to the first network device based on the X2 connection to the first network device. Optionally, if the second network device and the first network device directly exchange the messages, the first message may not carry the ID of the second network device.

2. The second network device and the first network device may alternatively indirectly exchange messages. The second network device may receive the first message sent by a core network device, and then send the second message to the core network device, where the second message is used to indicate the core network device to send the second message to the first network device. There may be the following two cases in which the first network device receives the first message sent by the core network device and sends the second message to the core network device.

(1) Both the first network device and the second network device are connected to a first core network device. In this case, the second network device receives the first message sent by the first core network device, and then the second network device sends the second message to the first core network device.

(2) The first network device is connected to a first core network device, the second network device is connected to a second core network device, and the first core network device and the second core network device are not a same core network device. In this case, the second network device receives the first message sent by the second core network device, and then the second network device sends the second message to the second core network device.

In the foregoing several manners, the messages can be exchanged between the first network device and the second network device, so that the first network device can obtain the X2 TNL configuration information of the third network device connected to the second network device.

According to a fourth aspect, a network device is provided. The network device is configured to perform the method for obtaining configuration information of a network device according to the first aspect. The network device may include a memory and a processor coupled to the memory. The memory is configured to store program code of the method for obtaining configuration information of a network device according to the first aspect. The processor is configured to execute the program code stored in the memory, to perform the method according to the first aspect or the method according to any one of the possible implementations of the first aspect.

According to a fifth aspect, a core network device is provided. The core network device is configured to perform the method for obtaining configuration information of a network device according to the second aspect. The core network device may include a memory and a processor coupled to the memory. The memory is configured to store program code of the method for obtaining configuration information of a network device according to the second aspect. The processor is configured to execute the program code stored in the memory, to perform the method according to the second aspect or the method according to any one of the possible implementations of the second aspect.

According to a sixth aspect, another network device is provided. The network device is configured to perform the method for obtaining configuration information of a network device according to the third aspect. The network device may include a memory and a processor coupled to the memory. The memory is configured to store program code of the method for obtaining configuration information of a network device according to the third aspect. The processor is configured to execute the program code stored in the memory, to perform the method according to the third aspect or the method according to any one of the possible implementations of the third aspect.

According to a seventh aspect, still another network device is provided. The network device may include a plurality of function modules, configured to correspondingly perform the method according to the first aspect or the method according to any one of the possible implementations of the first aspect.

According to an eighth aspect, another core network device is provided. The core network device may include a plurality of function modules, configured to correspondingly perform the method according to the second aspect or the method according to any one of the possible implementations of the second aspect.

According to a ninth aspect, still another network device is provided. The network device may include a plurality of function modules, configured to correspondingly perform the method according to the third aspect or the method according to any one of the possible implementations of the third aspect.

According to a tenth aspect, a communications system is provided. The communications system includes a first network device, a core network device, and a second network device. The first network device may be the network device according to the fourth aspect, the core network device may be the core network device according to the fifth aspect, and the second network device may be the network device according to the sixth aspect. Alternatively, the first network device may be the network device according to the seventh aspect, the core network device may be the core network device according to the eighth aspect, and the second network device may be the network device according to the ninth aspect.

According to an eleventh aspect, a computer-readable storage medium is provided. The computer-readable storage medium stores an instruction, and when the instruction is run on a computer, the computer is enabled to perform the method for obtaining configuration information of a network device according to the first aspect.

According to a twelfth aspect, a computer-readable storage medium is provided. The computer-readable storage medium stores an instruction, and when the instruction is run on a computer, the computer is enabled to perform the method for obtaining configuration information of a network device according to the second aspect.

According to a thirteenth aspect, a computer-readable storage medium is provided. The computer-readable storage medium stores an instruction, and when the instruction is run on a computer, the computer is enabled to perform the method for obtaining configuration information of a network device according to the third aspect.

According to a fourteenth aspect, a computer program product including an instruction is provided. When the computer program product is run on a computer, the computer is enabled to perform the method for obtaining configuration information of a network device according to the first aspect.

According to a fifteenth aspect, a computer program product including an instruction is provided. When the computer program product is run on a computer, the computer is enabled to perform the method for obtaining configuration information of a network device according to the second aspect.

According to a sixteenth aspect, a computer program product including an instruction is provided. When the computer program product is run on a computer, the computer is enabled to perform the method for obtaining configuration information of a network device according to the third aspect.

DESCRIPTION OF EMBODIMENTS

The following describes the technical solutions in the embodiments of this application with reference to the accompanying drawings in the embodiments of this application.

Figure 1:
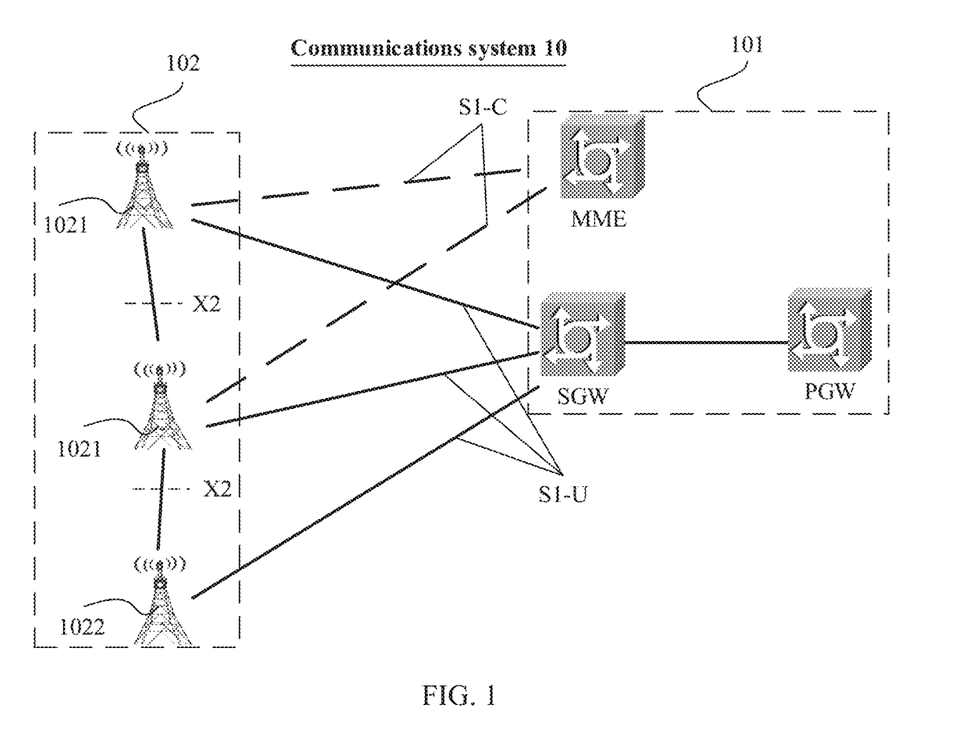
FIG. 1 is a schematic architectural diagram of a communications system according to an embodiment of this application.

The solutions in the embodiments of this application may be used in a communications system including at least two network devices. FIG. 1 is a schematic architectural diagram of a communications system 10 according to an embodiment of this application. As shown in FIG. 1, the communications system 10 may include a core network device 101 and a network device 102. The network device 102 is configured to provide a communication service for a terminal device, and the core network device 101 is configured to provide service support and service control for the network device 101. Specifically, the communications system includes but is not limited to a long term evolution (LTE) system, a 5G system, and a future communications system.

The core network device 101 may include core network elements, such as an MME, a serving gateway (SGW), and a public data network gateway (PGW). The MME is a network element located on a core network control plane, and may be configured to process signaling of the control plane. The SGW and the PGW are network elements located on a core network user plane, and may be configured to process data of the user plane.

The network device 102 is an apparatus that is deployed in a radio access network and that is configured to provide a wireless communication function for the terminal device. The network device 101 may include a macro base station, a micro base station (also referred to as a small cell), a relay station, an access point, a transmission reception point (TRP), and the like in various forms. In systems using different radio access technologies, names of network devices may be different. For example, the network device is referred to as an evolved NodeB (eNB or eNodeB) in an LTE system, and is referred to as a gNB in a 5G system. For ease of description, in all the embodiments of this application, apparatuses that provide a wireless communication function for the terminal device are collectively referred to as network devices.

The network device 102 may be classified into two types. One type is a network device that is connected to the control plane of a core network device. Specifically, the network device that is connected to the control plane of the core network device may be a network device connected to an MME, for example, a network device 1021 in FIG. 1. The other type is a network device that is connected to the control plane of the core network device. Specifically, the network device that is not connected to the control plane of the core network device may be a network device that is not connected to the MME, for example, a network device 1022 in FIG. 1.

As shown in FIG. 1, the two network devices may communicate with each other through an X2 connection. Before communicating with each other through the X2 connection, the two network devices need to obtain TNL addresses of each other to establish the X2 connection. For the network device 1022, a TNL address of the network device 1021 is usually preset in the network device 1022, so that the network device 1022 can establish the X2 connection to the network device 1021. Another network device 1011 (which is a network device 1011 whose TNL address is not preset in a network device 1012) needs to obtain a TNL address of the network device 1012 to establish an X2 connection to the network device 1012. A solution may be shown in FIG. 2. This solution is described below. In the following descriptions, the network device 1012 is referred to as a network device A, a network device 1011 whose TNL address is preset in the network device A is referred to as a network device B1, and the network device 1011 whose TNL address is not preset in the network device A is referred to as a network device B2.

Figure 2:
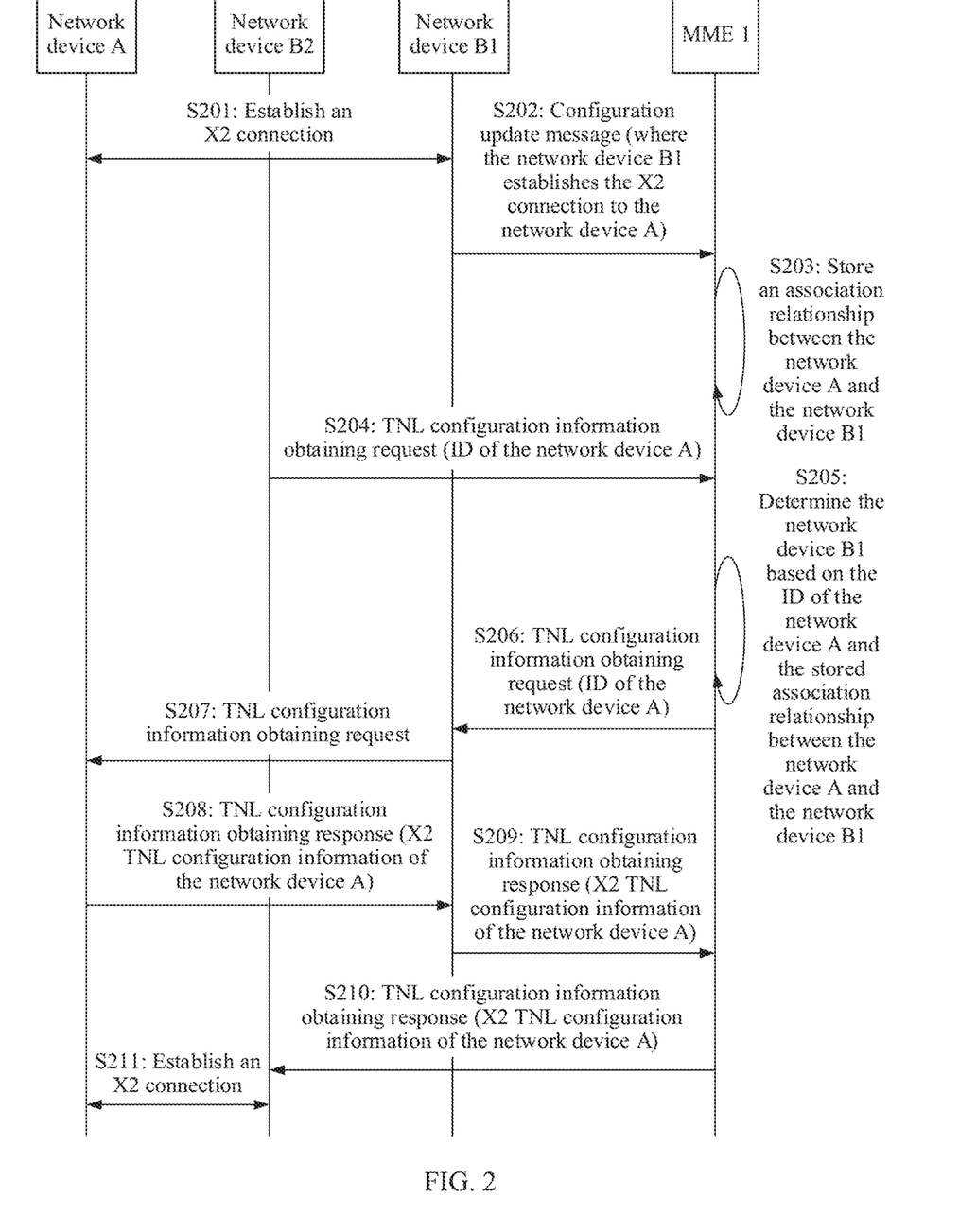
FIG. 2 is a schematic flowchart of establishing an X2 connection.

As shown in FIG. 2, this method includes the following steps.

Step S201: The network device A establishes an X2 connection to the network device B1 based on the TNL address that is of the network device B1 and that is preset in the network device A.

Step S202: The network device B1 sends a message for updating configuration to an MME 1 connected to the network device B1, to notify the MME 1 that the network device B1 establishes the X2 connection to the network device A; and the MME 1 receives the message for updating configuration.

Step S203: The MME 1 stores an association relationship between the network device A and the network device B1.

Step S204: The network device B2 sends a request for obtaining TNL configuration information to the MME 1, where the request for obtaining TNL configuration information carries an ID of the network device A; and the MME 1 receives the request for obtaining TNL configuration information.

Step S205: The MME 1 determines the network device B1 based on the ID of the network device A and the stored association relationship between the network device A and the network device B1.

Step S206: The MME 1 sends the Request for obtaining TNL configuration information to the network device B1, where the request for obtaining TNL configuration information carries the ID of the network device A; and the network device B1 receives the request for obtaining TNL configuration information.

Step S207: The network device B1 sends the request for obtaining TNL configuration information to the network device A based on the ID of the network device A, and the network device A receives the request for obtaining TNL configuration information.

Step S208: The network device A sends a Response for obtaining TNL configuration information to the network device B1, where the response for obtaining TNL configuration information carries X2 TNL configuration information of the network device A; and the network device B1 receives the configuration information obtaining response.

Step S209: The network device B1 sends the response for obtaining TNL configuration information to the MME 1, where the response for obtaining TNL configuration information carries the X2 TNL configuration information of the network device A; and the MME 1 receives the configuration information obtaining response.

Step S210: The MME 1 sends the response for obtaining TNL configuration information to the network device B2, where the response for obtaining TNL configuration information carries the X2 TNL configuration information of the network device A; and the network device B2 receives the response for obtaining TNL configuration information.

Step S211: The network device B2 establishes an X2 connection to the network device A based on the X2 TNL configuration information of the network device A.

In the solution shown in FIG. 2, the network device B2 can obtain only TNL address information of the network device A connected to the network device B1 connected to the MME 1. If the network device B2 and the network device B are connected to different MMEs, for example, if the network device B2 is connected to the MME 1, the network device B1 is connected to an MME 2, and the MME 1 and the MME 2 are not a same MME, when the network device B2 sends, to the MME 1, the request for obtaining TNL configuration information that carries the ID of the network device A, because the MME 1 does not store the association relationship between the network device B1 and the network device A, the MME 1 cannot determine the network device B1 based on the ID of the network device A. and the MME 1 does not know a network device or an MME to which the request for obtaining TNL configuration information needs to be sent. As a result, the network device B2 cannot obtain the TNL address information of the network device A. That is, according to the method shown in FIG. 2, a scenario in which a TNL address of a network device that is not connected to the control plane of a core network device is obtained is limited.

Therefore, the embodiments of this application provide a method for obtaining configuration information of a network device and a related device, to resolve a problem that according to the solution shown in FIG. 2, the scenario in which the TNL address of the network device that is not connected to the control plane of the core network device is obtained is limited.

In this application, an ID of a second network device connected to a core network device is carried in a message sent by a first network device for obtaining TNL address information, and the message for obtaining the TNL address information is sent to the second network device, to request to obtain a TNL address of a third network device that is not connected to the core network device, where the third network device is connected to the second network device. Then, the TNL address that is of the third network device and that is sent by the second network device is received. Because the message for obtaining the TNL address information carries the ID of the second network device instead of an ID of the third network device, the message for obtaining the TNL address information may be received by the second network device. Therefore, regardless of whether the first network device and the second network device belong to a same core network device, the first network device can obtain the TNL address information of the third network device connected to the second network device. In the solutions of this application, more TNL address information may be obtained. The following describes the solutions of this application.

Figure 3:
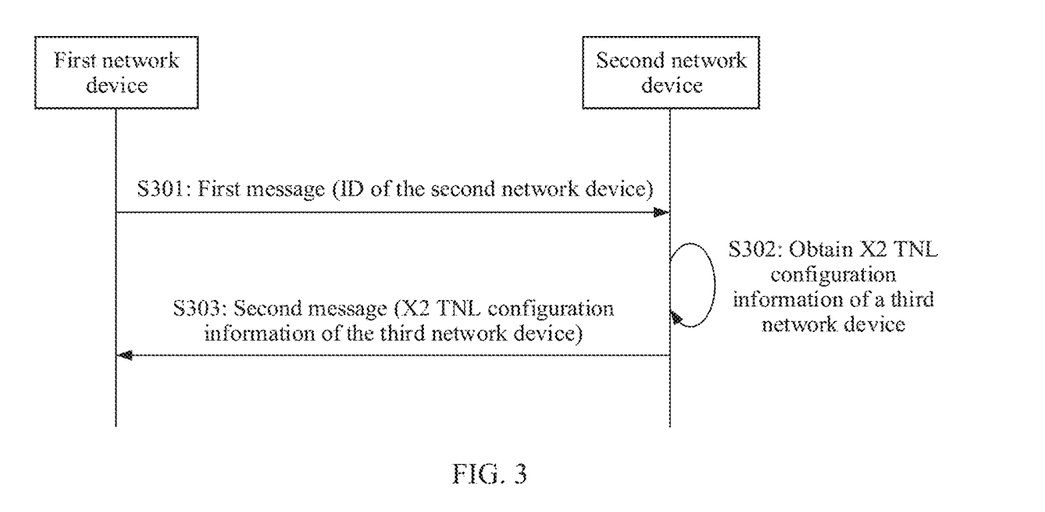
FIG. 3 is a schematic flowchart of a method for obtaining configuration information of a network device according to an embodiment of this application.

FIG. 3 is a schematic flowchart of a method for obtaining configuration information of a network device according to an embodiment of this application. The method is described from an interaction perspective. The method may include but is not limited to the following steps.

Step S301: A first network device sends a first message to a second network device, where the first message includes an ID of the second network device, the first message is used to obtain X2 TNL configuration information of a third network device, and the third network device is a network device that has established an X2 connection to the second network device; and the second network device receives the first message.

Herein, the first network device and the second network device may be devices connected to a core network device. In this application, that the network device is connected to the core network device means that the network device is connected to a control plane of the core network device. Specifically, that the network device is connected to the control plane of the core network device may mean that the network device is connected to an MME of the core network device.

The third network device may be a device that is not connected to the core network device. In this application, that the network device is not connected to the core network device means that the network device is not connected to the control plane of the core network device. Specifically, that the network device is not connected to the control plane of the core network device may mean that the network device is not connected to the MME of the core network device.

In a possible implementation, the first network device and the second network device may be network devices using a same standard. That the first network device and the second network device use the same standard means that the first network device and the second network device use a same radio access technology. For example, both the first network device and the second network device are network devices using a 4G standard, that is, both the first network device and the second network device are eNBs. The second network device and the third network device may be network devices using different standards. That the second network device and the third network device use the different standards means that the second network device and the third network device use different radio access technologies. For example, the second network device is a network device using a 4G standard and the third network device is a network device using a 5G standard, that is, the second network device is an eNB and the third network device is a gNB.

Optionally, the first message may further include a first indication, and the first indication is used to indicate to obtain the X2 TNL configuration information of the third network device. That is, the first indication is used to explicitly indicate that the first message is used to request to obtain the X2 TNL configuration information of the third network device. Optionally, a form of the first indication may be extending a value of existing information, for example, extending a value of an existing self-organizing network information request (SON information request).

Optionally, the first message may further include an ID of the third network device. Herein, the ID of the third network device is an ID of a network device whose TNL address information is expected to be obtained and to which an X2 connection is expected to be established by the first network device. For ease of distinguishing from another third network device, the ID that is of the third network device and that is included in the first message is referred to as an ID of a target network device below.

In this embodiment of this application, the first network device may send the first message to the second network device in the following two manners:

1. The first network device may directly send the first message to the second network device. Specifically, the first network device may send the first message to the second network device based on an X2 connection to the second network device. Herein, the first message may be, for example, an evolved universal terrestrial radio access new radio dual connectivity (E-UTRA-NR-DC) TNL information request (EN-DC TNL information request) message.

Optionally, if the first network device directly sends the first message to the second network device, the first message may not include the ID of the second network device.

2. The first network device may send the first message to the second network device via the core network device. For a specific implementation in which the first network device sends the first message to the second network device via the core network device, refer to subsequent descriptions. Details are not described herein.

Step S302: The second network device obtains the X2 TNL configuration information of the third network device.

There may be the following two cases in which the second network device obtains the X2 TNL configuration information of the third network device:

1. When the first message does not include the ID of the target network device, the second network device may obtain X2 TNL configuration information of all third network devices connected to the second network device. For a specific implementation in which the second network device obtains the X2 TNL configuration information of the third network device, refer to step S207 and step S208 shown in FIG. 2.

2. When the first message includes the ID of the target network device, the second network device may obtain the X2 TNL configuration information of the target network device when determining, based on the ID of the target network device, that the second network device is connected to the target network device. For a specific implementation in which the second network device obtains the X2 TNL configuration information of the target network device, refer to step S207 and step S208 shown in FIG. 2.

The request for obtaining TNL configuration information in step S207 may be, for example, an EN-DC configuration transfer request message. The response for obtaining TNL configuration information in step S208 may be, for example, an E-UTRA-NR dual connectivity configuration transfer response (EN-DC Configuration Transfer Response) message. In this case, the second network device may be specifically an eNB, and the third network device may be specifically a gNB in evolved mobile communications system terrestrial radio access new radio dual connectivity, namely, an en-gNB.

Step S303: The second network device sends a second message to the first network device, where the second message includes the X2 TNL configuration information of the third network device; and the first network device receives the second message.

In this embodiment of this application, corresponding to the manners in which the first network device sends the first message, there may be the following two manners in which the second network device sends the second message to the first network device:

1. The second network device may directly send the second message to the first network device. Specifically, the second network device may send the second message to the first network device based on the X2 connection to the first network device. Herein, the second message may be, for example, an EN-DC TNL information response (EN-DC TNL information Response) message.

2. The second network device may send the second message to the first network device via the core network device. For a manner in which the second network device sends the second message to the first network device via the core network device, refer to subsequent descriptions. Details are not described herein.

Optionally, the second message may carry X2 TNL configuration information of a plurality of third network devices that have X2 connections to the second network device, and carry IDs corresponding to the plurality of third network devices.

Specifically, the X2 TNL configuration information may include a plurality of pieces of address information, for example, an X2 transport layer address, an Internet protocol (IP) secure transport layer address, a GPRS tunneling protocol transport layer address, and an indirect X2 transport layer address.

Figure 4:
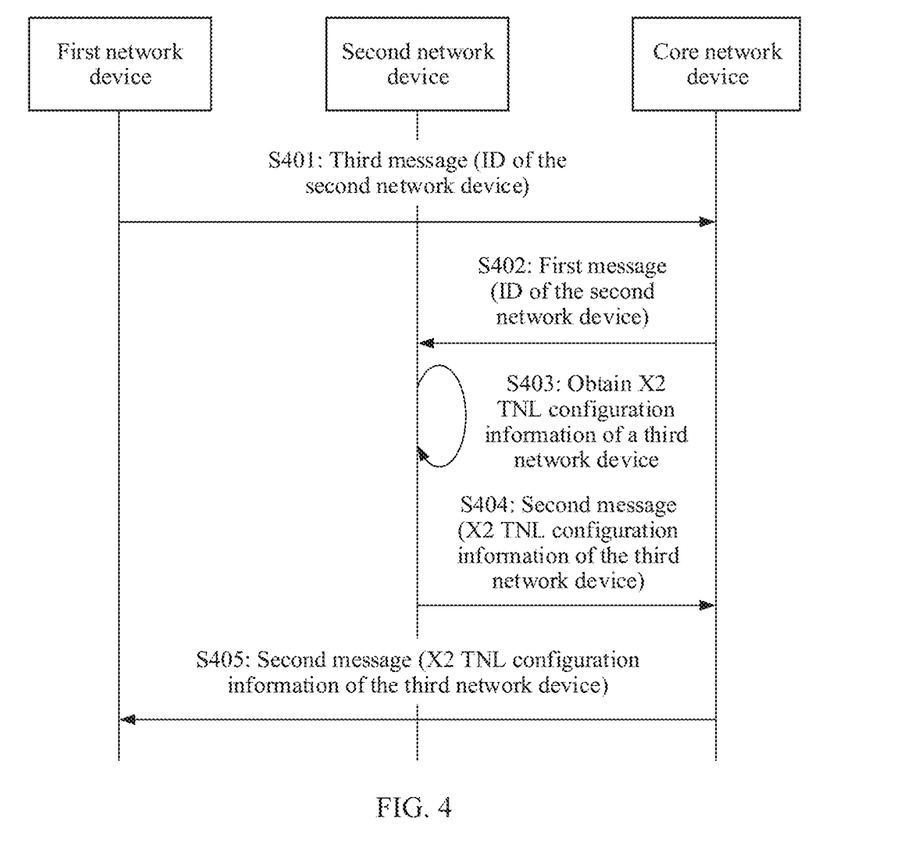
FIG. 4 is a schematic flowchart of another method for obtaining configuration information of a network device according to an embodiment of this application.

As described above, the first network device and the second network device may exchange the messages via the core network device. FIG. 4 is a schematic flowchart of another method for obtaining configuration information of a network device according to an embodiment of this application. As shown in FIG. 4, the method includes the following steps.

S401: A first network device sends a third message to a core network device, where the third message includes an ID of a second network device, and the third message is used to obtain X2 TNL configuration information of a third network device, and the core network device receives the third message.

Herein, for descriptions of the first network device, the second network device, and the third network device, refer to the descriptions of step S301. The first network device and the second network device may be network devices connected to a same core network device. For example, both the first network device and the second network device are connected to a first core network device. The first network device and the second network device may alternatively be network devices connected to different core network devices. For example, the first network device is connected to a first core network device, and the second network device is connected to a second core network device. Optionally, the third message may further include a TAI corresponding to the second network device, so that the core network device can determine, based on the TAI corresponding to the second network device, a core network device connected to the second network device.

Optionally, the third message may further include a first indication, and the first indication is used to indicate to obtain the X2 TNL configuration information of the third network device. That is, the first indication is used to explicitly indicate that the third message is used to request to obtain the X2 TNL configuration information of the third network device. For other descriptions of the first indication, refer to the descriptions of step S301. Details are not described herein again.

Optionally, if the first network device sends first messages to a plurality of second network devices, to separately obtain X2 TNL configuration information of third network devices connected to the plurality of second network devices, the third message may include IDs of the plurality of second network devices. If the third message includes the IDs of the plurality of second network devices, the third message may further include TAIs of the plurality of second network devices.

Optionally, if the first network device sends first messages to a plurality of second network devices, to separately obtain X2 TNL configuration information of third network devices connected to the plurality of second network devices, the first network device may also separately send a plurality of third messages to the core network device, where each third message includes an ID of a corresponding second network device.

Optionally, the third message may further include an ID of the third network device. For a definition of the ID of the third network device, refer to the descriptions of step S301. Details are not described herein again.

In this embodiment of this application, the third message may be, for example, an eNB configuration transfer message.

S402: The core network device sends a first message to the second network device, where the first message includes the ID of the second network device, and the first message is used to obtain the X2 TNL configuration information of the third network device; and the second network device receives the first message.

If both the first network device and the second network device are network devices connected to the first core network device, the sending, by the core network device, a first message to the second network device is specifically: sending, by the first core network device, the first message to the second network device. Specifically, the first core network device may send the first message to the second network device based on the ID of the second network device. Optionally, if the third message includes IDs of a plurality of second network devices, the first core network device may separately send first messages to the plurality of second network devices based on the IDs of the plurality of network devices. The ID of the second network device included in the first message is an ID of a second network device that is to receive the first message. For example, if the third message includes IDs of a network device 1, a network device 2, and a network device 3, the first core network device separately sends a message 1 to the network device 1, a message 2 to the network device 2, and a message 3 to the network device 3 based on the IDs of the network device 1, the network device 2, and the network device 3, where message 1 includes the ID of the network device 1, the message 2 includes the ID of the network device 2, and the message 3 includes the ID of the network device 3, and the message 1, the message 2, and the message 3 are all first messages.

If the first network device is connected to the first core network device, the second network device is connected to the second core network device, and the first core network device and the second core network device are not a same core network device, the sending, by the core network device, a first message to the second network device is specifically: sending, by the first core network device, the first message to the second core network device; and sending, by the second core network device, the first message to the second network device. Specifically, the first core network device may determine, based on the TAI corresponding to the second network device, that a core network device connected to the second network device is the second core network device, and then the first core network device sends the first message to the second core network device. After receiving the first message, the second core network device sends the first message to the second network device.

Optionally, if the third message includes TAIs of a plurality of second network devices, the first core network device may determine, based on the TAIs corresponding to the plurality of network devices, one or more core network devices connected to the plurality of network devices, and then separately send, to the corresponding core network devices or the network devices, first messages to be sent to the plurality of network devices, where the ID of the second network device included in the first message is an ID of a network device that is to receive the first message. For example, the second message includes a TAI 1, a TAI 2, and IDs of a network device 1, a network device 2, and a network device 3. The network device 1 and the network device 3 correspond to the TAI 1, the network device 2 corresponds to the TAI 2, the TAI 1 corresponds to the second core network device, and the TAI 2 corresponds to the first core network device. In this case, the first network device sends a message 1 and a message 2 to the second core network device, where the message 1 includes the ID of the network device 1, and the message 2 includes the ID of the network device 3; and the first network device sends a message 3 to the network device 2, where the message 3 includes the ID of the network device 2.

For other descriptions of the first message, refer to the descriptions of step S301. Herein, the first message may be, for example, an MME configuration transfer message.

Step S403: The second network device obtains the X2 TNL configuration information of the third network device.

For a specific implementation of step S403, refer to the descriptions of step S302. Details are not described herein again.

Step S404: The second network device sends a second message to the core network device, where the second message includes the X2 TNL configuration information of the third network device; and the core network device receives the second message.

If both the first network device and the second network device are network devices connected to the first core network device, the sending, by the second network device, a second message to the core network device is specifically: sending, by the second network device, the second message to the first core network device. Herein, the second message may be, for example, an eNB configuration transfer message.

If the first network device is connected to the first core network device, the second network device is connected to the second core network device, and the first core network device and the second core network device are not a same core network device, the sending, by the second network device, a second message to the core network device is specifically: sending, by the second network device, a second message to the second core network device, and sending, by the second core network device, a second message to the first core network device. The second message sent by the second network device to the second core network device may be the same as the second message sent by the second core network device to the first core network device. Alternatively, the second message sent by the second network device to the second core network device may be different from the second message sent by the second core network device to the first core network device. Herein, the second message sent by the second network device to the second core network device may be, for example, an eNB configuration transfer message. The second message sent by the second core network device to the first core network device may be, for example, an MME configuration transfer message.

Step S405: The core network device sends the second message to the first network device, and the first network device receives the second message.

Herein, the second message sent by the core network device to the first network device may be, for example, an MME configuration transfer message.

For other descriptions of the second message in step S404 and step S405, refer to the descriptions of step S303. Details are not described herein again.

With reference to the embodiments shown in FIG. 3 and FIG. 4, it can be learned that regardless of whether the second network device and the first network device are network devices connected to a same core network device, the first message can be received by the second network device, and the second network device may further send the X2 TNL configuration information of the third network device to the first network device, so that the first network device may not only obtain the X2 TNL configuration information of the third network device connected to the second network device that is connected to the same core network device as the first network device, but also obtain the X2 TNL configuration information of the third network device connected to the second network device that is not connected to the same core network device as the first network device, that is, the first network device may obtain X2 TNL configuration information of more third network devices.

Optionally, after receiving the second message, the first network device may further establish an X2 connection to the third network device. To be specific, after step S303 or step S405, the method may further include: establishing, by the first network device, the X2 connection to the third network device.

Specifically, the first network device may send an Request for establishing an X2 connection to the third network device based on the X2 TNL configuration information of the third network device. The Request for establishing an X2 connection may carry X2 TNL configuration information of the first network device; and the third network device sends an X2 connection establishment response to the first network device based on the X2 TNL configuration information of the first network device.

In some possible scenarios, the second network device may be a network device adjacent to the first network device. That the second network device is adjacent to the first network device may mean that there is an overlapping area between a coverage area of the second network device and a coverage area of the first network device, or that a geographical location of the first network device is adjacent to a geographical location of the second network device. Before sending the first message to the second network device, the first network device may further determine the second network device and the ID of the second network device.

In this embodiment of this application, the first network device may determine the second network device and the ID of the second network device in the following manners:

(1) The first network device may determine the second network device and the ID of the second network device based on a fourth message reported by a terminal device. The fourth message may include at least one type of information of signal strength that is of a network device and that is detected by the terminal device, location information of the terminal device, a neighboring cell ID, or the ID of the second network device.

Herein, the terminal device is a terminal device in a cell corresponding to the first network device, that is, a terminal device within the coverage area of the first network device.

Specifically, the first network device may determine, based on the signal strength that is of the network device and that is detected by the terminal device, one or more network devices with strongest signal strength as one or more second network devices. Alternatively, the first network device may determine, based on the neighboring cell ID, a network device corresponding to the neighboring cell ID as the second network device, and determine the neighboring cell ID as the ID of the second network device. Alternatively, the first network device may locally obtain location information of the second network device, and then determine, based on the location information of the terminal device and the location information of the second network device, one or more network devices whose locations are adjacent to a location of the terminal device as one or more second network devices.

Optionally, in a dual connectivity establishment scenario, the fourth message may further include an ID of a target network device, and the terminal device may report the fourth message to the first network device, so that the first network device can determine the second network device based on the fourth message, further obtain X2 TNL configuration information of the target network device from the second message sent by the second network device, and establish an X2 connection to the target network device. Therefore, the first network device and the target network device jointly provide a communication service for the terminal device.

(2) Information about the second network device adjacent to the first network device may be preset in the first network device, and the first network device may determine the second network device and the ID of the second network device based on the locally preset information about the second network device.

This is not limited to the descriptions herein. In an optional implementation, there may be another manner of determining the second network device and the ID of the second network device. This is not limited in this embodiment of this application.

The foregoing describes in detail the method for obtaining configuration information of a network device in this application. To better implement the method in this application, correspondingly, the following provides apparatuses in this application.

Figure 5:
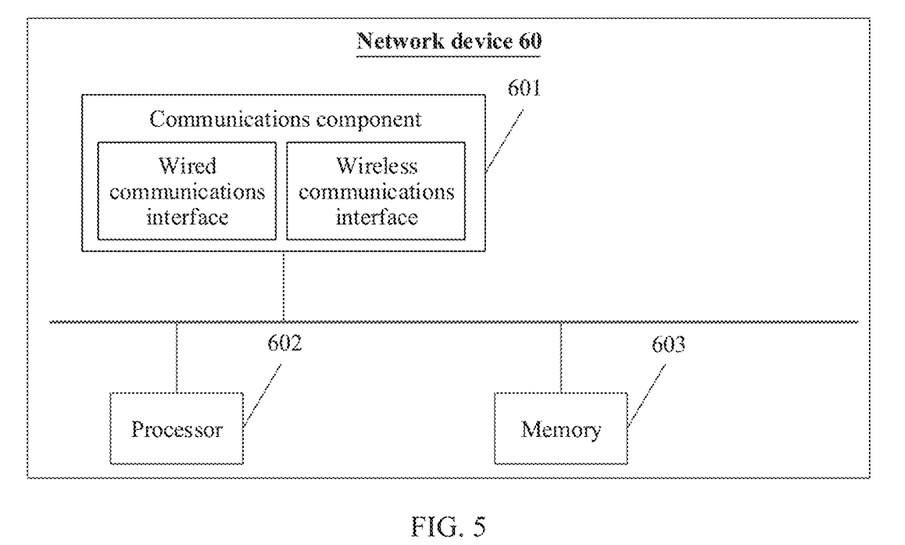
FIG. 5 is a schematic structural diagram of a network device according to this application.

FIG. 5 is a schematic structural diagram of a network device according to this application. The network device 60 may be implemented as the network device 1021 in the communications system shown in FIG. 1. As shown in FIG. 5, the network device 60 may include a communications component 601, one or more processors 602, and a memory 603. The communications component 601, the processor 602, and the memory 603 may be connected through one or more buses, or may be connected in another manner.

The communications component 601 may be used by the network device 60 to communicate with another communications device. The another communications device may be, for example, a core network device or a terminal device. The communications component 601 may include a wired communications interface, for example, an Ethernet port or an optical fiber interface. Optionally, the communications component 602 may further include a wireless communications interface. In a specific implementation, the communications component 601 may include a radio frequency interface and a radio frequency circuit, to implement a function implemented by the wireless communications interface. The radio frequency circuit may include a transceiver, a component (such as a conductor or a conducting wire) configured to send and receive an electromagnetic wave in free space during wireless communication, and the like.

In this embodiment of this application, the communications component 601 may be configured to perform the sending or receiving operation performed by the first network device in the embodiment shown in FIG. 3 or FIG. 4. The operation may include steps S301 and S303 and/or steps S401 and S405. The communications component 601 may alternatively be configured to perform the sending or receiving operation performed by the second network device in the embodiment shown in FIG. 3 or FIG. 4. The operation includes steps S301 to S303 and/or steps S402 to S404.

The memory 603 is coupled to the processor 602, and is configured to store various software programs and/or a plurality of sets of instructions. In a specific implementation, the memory 603 may include a high-speed random access memory, and may further include a nonvolatile memory. The memory 603 may store a network communication program, and the network communication program may be configured to communicate with another communications device. An operating system, for example, an operating system such as Windows or Linux, may further be embedded in the memory 603.

In some embodiments of this application, the memory 603 may be configured to store a program for implementing, on a network device side, the method for obtaining configuration information of a network device according to one or more method embodiments of this application.

The processor 602 may be a general purpose processor, for example, a central processing unit (CPU). The processor 602 may alternatively be a hardware chip. The hardware chip may be one or a combination of the following: an application-specific integrated circuit (ASIC), a field programmable gate array (FPGA), or a complex programmable logic device (CPLD). Alternatively, the processor 602 may be a combination of the foregoing processors. The processor 602 may process data received by the communications component 601, and the processor 602 may further process data that is to be sent to the communications component 601 for transmission through a wireless transmission medium or a wired transmission medium.

The processor 602 may be configured to read and execute a computer-readable instruction. Specifically, the processor 602 may be configured to invoke the program stored in the memory 603, for example, the program for implementing, on the network device side, the method for obtaining configuration information of a network device according to the one or more method embodiments of this application, and execute, in combination with the communications component 601, an instruction included in the program.

In this embodiment of this application, the processor 602 may be configured to perform steps S301 and S303 and/or steps S401 and S404 by using the communications component 601. The processor may alternatively be configured to perform steps S301 to S303 and/or steps S402 to S404 by using the communications component 601.

It should be understood that the network device 60 shown in FIG. 5 is merely an implementation of this application. In an actual application, the network device 60 may include more or fewer components. This is not limited in this application.

Figure 6:
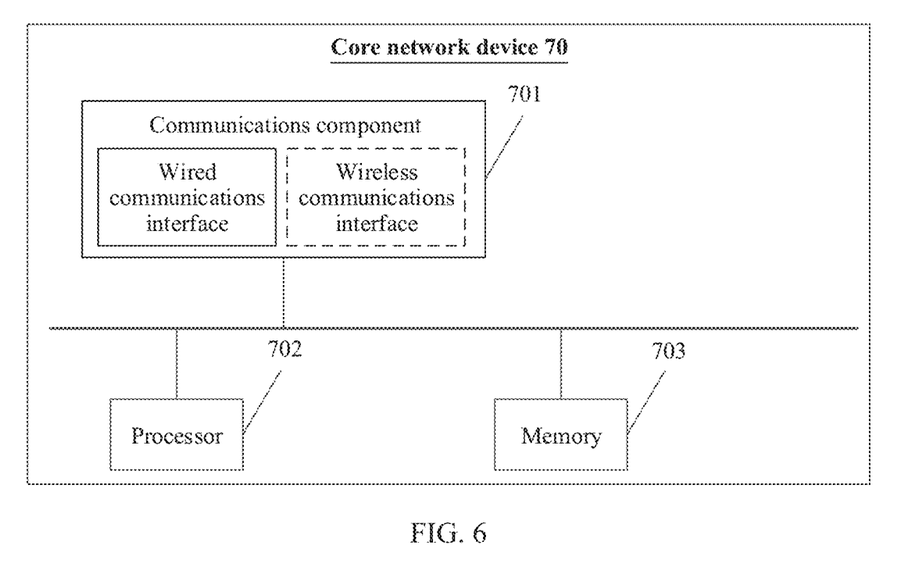
FIG. 6 is a schematic structural diagram of a core network device according to this application.

FIG. 6 is a schematic structural diagram of a core network device 70 according to this application. The core network device 70 may be implemented as the core network device 101 in the communications system shown in FIG. 1. As shown in FIG. 6, the core network device 70 may include a communications component 701, one or more processors 702, and a memory 703. The communications component 701, the processor 702, and the memory 703 may be connected through one or more buses, or may be connected in another manner.

The communications component 701 may be used by the core network device 70 to communicate with another communications device. The another communications device may be, for example, a core network device or a terminal device. The communications component 701 may include a wired communications interface, for example, an Ethernet port or an optical fiber interface. Optionally, the communications component 702 may further include a wireless communications interface. In a specific implementation, the communications component 701 may include a radio frequency interface and a radio frequency circuit, to implement a function implemented by the wireless communications interface. The radio frequency circuit may include a transceiver, a component (such as a conductor or a conducting wire) configured to send and receive an electromagnetic wave in free space during wireless communication, and the like.

In this embodiment of this application, the communications component 701 may be configured to perform the sending or receiving operation performed by the core network device in the embodiment shown in FIG. 4. The operation includes steps S401, S402, S404, and S405.

The memory 703 is coupled to the processor 702, and is configured to store various software programs and/or a plurality of sets of instructions. In a specific implementation, the memory 703 may include a high-speed random access memory, and may further include a nonvolatile memory. The memory 703 may store a network communication program, and the network communication program may be configured to communicate with another communications device. An operating system, for example, an operating system such as Windows or Linux, may further be embedded in the memory 703.

In some embodiments of this application, the memory 703 may be configured to store a program for implementing, on a core network device side, the method for obtaining configuration information of a network device according to one or more method embodiments of this application.

The processor 702 may be a general purpose processor, for example, a central processing unit (CPU). The processor 702 may alternatively be a hardware chip. The hardware chip may be one or a combination of the following: an application-specific integrated circuit (ASIC), a field programmable gate array (FPGA), or a complex programmable logic device (CPLD). Alternatively, the processor 702 may be a combination of the foregoing processors. The processor 702 may process data received by the communications component 701, and the processor 702 may further process data that is to be sent to the communications component 701 for transmission through a wireless transmission medium or a wired transmission medium.

The processor 702 may be configured to read and execute a computer-readable instruction. Specifically, the processor 702 may be configured to invoke the program stored in the memory 703, for example, the program for implementing, on the core network device side, the method for obtaining configuration information of a network device according to the one or more method embodiments of this application, and execute, in combination with the communications component 701, an instruction included in the program.

In this embodiment of this application, the processor 702 may be configured to perform steps S401, S402, S404, and S405 by using the communications component 701.

It should be understood that the core network device 70 shown in FIG. 6 is merely an implementation of this application. In an actual application, the core network device 70 may include more or fewer components. This is not limited in this application.

Figure 7:
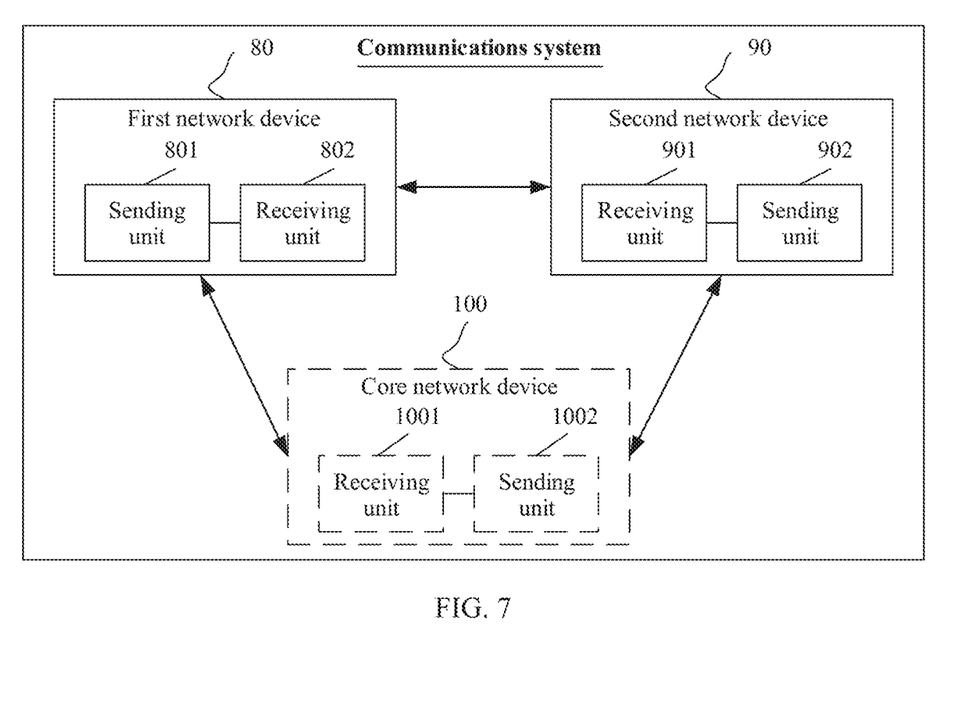
FIG. 7 is a function block diagram of a communications system including network devices and a core network device according to this application.

FIG. 7 shows a communications system including a first network device, a second network device, and a core network device according to this application. The communications system includes the first network device 80 and the second network device 90. Optionally, the communications system may further include the core network device 100. The communications system may be the communications system 10 shown in FIG. 1, the first network device 80 and the second network device 90 may be the network devices 1021 in the system shown in FIG. 1, and the core network device 100 may be the core network device 101 in the system shown in FIG. 1. Descriptions are separately provided below.

As shown in FIG. 7, the first network device 80 may include a sending unit 801 and a receiving unit 802.

The sending unit 801 is configured to send a first message to the second network device, where the first message includes an ID of the second network device, the first message is used to obtain X2 TNL configuration information of a third network device, and the third network device is a network device that has established an X2 connection to the second network device.

The receiving unit 802 is configured to receive a second message sent by the second network device, where the second message includes the X2 TNL configuration information of the third network device.

Herein, the sending unit 801 may be configured to perform step S301 in the embodiment in FIG. 3 and/or step S401 in the embodiment in FIG. 4. The receiving unit 802 may be configured to perform step S303 in the embodiment in FIG. 3 and/or step S405 in the embodiment in FIG. 4.

As shown in FIG. 7, the second network device 90 may include a receiving unit 901 and a sending unit 902.

The receiving unit 901 is configured to receive the first message sent by the first network device, where the first message is used to obtain the X2 TNL configuration information of the third network device, the third network device is the network device that has established the X2 connection to the second network device, and the first message includes the ID of the second network device.

The receiving unit 901 is further configured to obtain the X2 TNL configuration information of the third network device.

The sending unit 902 is configured to send the second message to the first network device, where the second message includes the X2 TNL configuration information of the third network device.

Herein, the receiving unit 901 may be configured to perform step S301 in the embodiment in FIG. 3 and/or step S402 in the embodiment in FIG. 4. The sending unit 902 may be configured to perform step S303 in the embodiment in FIG. 3 and/or step S404 in the embodiment in FIG. 4. For details, refer to related descriptions. Details are not described herein again.

As shown in FIG. 7, the core network device 100 may include a receiving unit 1001 and a sending unit 1002.

The receiving unit 1001 is configured to receive a third message sent by the first network device, where the third message includes the ID of the second network device, the third message is used to obtain the X2 TNL configuration information of the third network device, and the third network device is the network device that has established the X2 connection to the second network device.

The sending unit 1002 is configured to send the first message to the second network device, where the first message includes the ID of the second network device, and the first message is used to obtain the X2 TNL configuration information of the third network device.

The receiving unit 1001 is further configured to receive the second message sent by the second network device, where the second message includes the X2 TNL configuration information of the third network device.

The sending unit 1002 is further configured to send the second message to the first network device.

Herein, the receiving unit 1001 may be configured to perform steps S401 and S404 in the embodiment in FIG. 5. The sending unit 1001 may be configured to perform steps S402 and S405 in the embodiment in FIG. 5. For details, refer to related descriptions. Details are not described herein.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, all or some of the procedures or the functions according to the embodiments of this application are generated. The computer instruction may be stored in a computer-readable storage medium, or may be transmitted through the computer-readable storage medium. The computer-readable storage medium may be any usable medium accessible by a computer, or a data storage device, such as a server or a data center, integrating one or more usable media. The usable medium may be a semiconductor medium (for example, an SSD) or the like.

A person of ordinary skill in the art may be aware that, in combination with the examples described in the embodiments disclosed in this specification, modules and method steps may be implemented by electronic hardware, or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It should be noted that "first", "second", "third", and various numbers in the embodiments of this application are merely used for differentiation for ease of description, and are not intended to limit the scope of the embodiments of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communications system, comprising a first base station connected to a control plane of a core network, a second base station connected to the control plane of the core network, and a core network device, wherein:

the first base station is configured to send a first message to the core network device, wherein the first message comprises an identity of the second base station, the first message is used to request for X2 transport network layer (TNL) configuration information of a third base station, and wherein the third base station has established an X2 connection to the second base station, and the third base station is not connected to the control plane of the core network;

the core network device is configured to receive the first message from the first base station, and send a second message to the second base station, wherein the second message comprises the identity of the second base station, and wherein the second message is used to request for the X2 TNL configuration information of the third base station;

the second base station is configured to receive the second message from the core network device, and send the X2 TNL configuration information of the third base station to the first base station via the core network device; and the first base station is further configured to:
  receive the X2 TNL configuration information of the third base station from the second base station via the core network device; and
  establish an X2 connection to the third base station according to the X2 TNL configuration information of the third base station, wherein the X2 connection is used in dual connectivity provided by the first base station and the third base station to a terminal device.

2. The system according to claim 1, wherein the second base station is configured to send a third message to the core network device, wherein the third message comprises the X2 TNL configuration information of the third base station;

wherein the core network device is further configured to receive the third message from the second base station, and send a mobility management entity (MME) configuration transfer message to the first base station, wherein the MME configuration transfer message comprises the X2 TNL configuration information of the third base station.

3. The system according to claim 1, wherein the first message further comprises an identity of the third base station.

4. The system according to claim 1, wherein the first message further comprises a tracking area identity corresponding to the second base station.

5. The system according to claim 1, wherein the first base station is further configured to determine the second base station and the identity of the second base station based on a fourth message reported by a terminal device or information that is about the second base station and that is locally preset in the first base station, wherein the fourth message comprises at least one type of information of signal strength that is of a base station and that is detected by the terminal device, location information of the terminal device, a neighboring cell identity, or the identity of the second base station.

6. The system according to claim 1, wherein the first base station and the second base station use a same standard, and wherein the second base station and the third base station use different standards.

7. A method for obtaining configuration information of a network device in a system comprising a first base station connected to a control plane of a core network, a second base station connected to the control plane of the core network, and a core network device, the method comprising:

sending, by a first base station, a first message to the core network device to cause the core network device to send a second message to a second base station, wherein the first message comprises an identity of the second access base station, wherein the first message is used to request for X2 transport network layer (TNL) configuration information of a third base station, wherein the second message comprises the identity of the second base station, and wherein the second message is used to request for the X2 TNL configuration information of the third base station, and wherein the third base station has established an X2 connection to the second base station, and the third base station is not connected to the control plane of the core network;

receiving, by the first base station, the X2 TNL configuration information of the third base station from the second base station via the core network device; and establishing, by the first base station, an X2 connection to the third base station according to the X2 TNL configuration information of the third base station, wherein the X2 connection is used in dual connectivity provided by the first base station and the third base station to a terminal device.

8. The method according to claim 7, wherein the X2 TNL configuration information of the third base station is comprised in a third message that is sent by the second base station to a core network device, wherein the third message is used to indicate the core network device to send the X2 TNL configuration information of the third base station to the first base station.

9. The method according to claim 7, wherein the first message further comprises an identity of the third base station.

10. The method according to claim 8, wherein the X2 TNL configuration information of the third base station is comprised in a mobility management entity (MME) configuration transfer message sent by the core network device to the first base station.

11. The method according to claim 7, wherein the first message further comprises a tracking area identity corresponding to the second base station.

12. The method according to claim 7, wherein after the first base station receives the X2 TNL configuration information of the third base station, the method further comprises:
establishing, by the first base station, an X2 connection to the third base station.

13. The method according to claim 7, wherein the method further comprises:
determining, by the first base station, the second base station and the identity of the second base station based on a fourth message reported by a terminal device or information that is about the second base station and that is locally preset in the first base station, wherein the fourth message comprises at least one type of information of signal strength that is of a base station and that is detected by the terminal device, location information of the terminal device, a neighboring cell identity, or the identity of the second device base station.

14. A base station, wherein the base station is a first base station connected to a control plane of a core network, and the base station comprises:
at least one processor; and
one or more memories coupled to the at least one processor and storing programming instructions for execution by the at least one processor to:
send a first message to a core network device to cause the core network device to send a second message to a second base station, wherein the second base station is connected to the control plane of the core network, wherein the first message comprises an identity of the second base station, wherein the first message is used to request X2 transport network layer (TNL) configuration information of a third base station, wherein the second message comprises the identity of the second base station, wherein the second message is used to request for the X2 TNL configuration information of the third base station, and wherein the third base station has established an X2 connection to the second base station, and the third base station is not connected to the control plane of the core network;
receive the X2 TNL configuration information of the third base station from the second base station via the core network device;
establish an X2 connection to the third base station according to the X2 TNL configuration information of the third base station, wherein the X2 connection is used in dual connectivity provided by the first base station and the third base station to a terminal device.

15. The base station according to claim 14, wherein the X2 TNL configuration information of the third base station is comprised in a third message that is sent by the second base station to a core network device, wherein the third message is used to indicate the core network device to send the X2 TNL configuration information of the third base station to the base station.

16. The base station according to claim 14, wherein the first message further comprises an identity of the third base station.

17. The base station according to claim 15, wherein the X2 TNL configuration information of the third base station is comprised in a mobility management entity (MME) configuration transfer message sent by the core network device to the base station.

18. The base station according to claim 14, wherein the one or more memories store the programming instructions for execution by the at least one processor further to:
determine the second base station and the identity of the second base station based on a fourth message reported by a terminal device or information that is about the second base station and that is locally preset in the base station, wherein the fourth message comprises at least one type of information of signal strength that is of a base station and that is detected by the terminal device, location information of the terminal device, a neighboring cell identity, or the identity of the second base station.

\* \* \* \* \*

UNITED STATES PATENT AND TRADEMARK OFFICE
CERTIFICATE OF CORRECTION

PATENT NO. : 11,523,468 B2
APPLICATION NO. : 17/212892
DATED : December 6, 2022
INVENTOR(S) : Xingxing Hu, Philippe Reininger and Hongzhuo Zhang It is certified that error appears in the above-identified patent and that said Letters Patent is hereby corrected as shown below:

In the Claims

Column 23/Line 3 - In Claim 7, after "second" delete "access".

Column 23/Line 59 - In Claim 13, after "second" delete "device".

Signed and Sealed this
Twenty-fifth Day of April, 2023

Katherine Kelly Vidal
*Director of the United States Patent and Trademark Office*